United States Patent

Mishra et al.

Patent Number: 5,805,599
Date of Patent: Sep. 8, 1998

[54] ADAPTIVE CHANNEL ALLOCATION SYSTEM FOR COMMUNICATION NETWORK

[75] Inventors: Partho Pratim Mishra, Murray Hill; Kadangode K. Ramakrishnan, Berkeley Heights, both of N.J.

[73] Assignee: AT&T Corp., Middletown, N.J.

[21] Appl. No.: 760,174

[22] Filed: Dec. 4, 1996

[51] Int. Cl.$^6$ ................................................ H04J 1/02
[52] U.S. Cl. ................................................ 370/468; 370/437
[58] Field of Search ........................ 370/232, 233, 370/389, 391, 395, 399, 430, 431, 437, 465, 468

[56] References Cited

U.S. PATENT DOCUMENTS

| | | | |
|---|---|---|---|
| 5,258,979 | 11/1993 | Oomuro et al. | 370/232 |
| 5,265,091 | 11/1993 | Van Landegem | 370/232 |
| 5,452,297 | 9/1995 | Hiller et al. | 370/395 |
| 5,583,857 | 12/1996 | Soumiya et al. | 370/223 |
| 5,623,492 | 4/1997 | Taraslinna | 370/397 |

*Primary Examiner*—Hassan Kizou
*Assistant Examiner*—A. Bnimoussa

[57] ABSTRACT

An adaptive channel allocation system is provided which monitors the actual channel bandwidth used by network sources. Sources which have placed demands for network bandwidth, but not used that bandwidth, have their channel resources down-allocated according to a smoothed exponential function. Sources which are idle are detected by means of an aging function.

12 Claims, 4 Drawing Sheets

REDUCTION FACTOR = $(e^{\alpha\mu} - e^{\alpha\delta})$

ADAPTIVE CHANNEL ALLOCATION SYSTEM FOR COMMUNICATION NETWORK

FIELD OF THE INVENTION

The invention relates to channel allocation mechanisms in communication networks, particularly Asynchronous Transfer Mode (ATM) networks.

BACKGROUND OF THE INVENTION

As deployment of high-capacity networks, including ATM networks, has increased for a variety of applications, industry interest in efficient allocation of channel bandwidth has risen. In demand-based systems such as ATM, standards for allocating flow to communication sources requesting bandwidth in the network have been proposed. One challenge to greater network efficiency is the problem of communication sources which make requests for system bandwidth (VC, virtual channel) to receiving switches, but then fail to utilize or fully utilize the requested bandwidth. Such sources divert available bandwidth resources away from the total network pool available to other sources, which are prepared to make use of that bandwidth.

Various proposals or practical approaches have been made to address the problem of underutilizing sources. These include those promulgated by the ATM Forum (an open industry consortium), which has offered certain ABR source/destination policies, related to requesting sources. One such policy is ATM Rule 5, which relates to a use-it-or-lose-it function applied at the communication source. That policy envisions an inactive source which finally reawakens, to have its allocation recalculated according to how long it was inactive, the prior rate allocation, and new bandwidth needs. ATM Forum publications or presentations, such as Contribution 95-0563 and others since, have similarly identified a need for a use-it-or-lose-it function for underutilizing sources. However, in many of these solutions an idle or bursty source has its allocation downgraded in a simple and drastic fashion after a certain span of time, and penalizing the source when it wakes up, when it most needs the resources. However, if the allocation to a source were unilaterally withdrawn from it by the network, without the source knowing it, it would result in the source impinging the network with steeply increased needs when the source wakes up, causing overload.

Many of these solutions rely upon the source itself, exclusively, to self-monitor utilization. However at least some sources can be assumed to exhibit resource "greed" or desire to retain bandwidth, to the detriment of overall network efficiency. Altogether, sources which make a request for network bandwidth, but then do not use it, or use it idly, must be addressed to maintain highest efficiency of network resource allocation. Moreover, a source-based policy alone results in potentially reducing the source rate excessively, and causing the source slow down on waking up, which is poor behavior for certain applications such as TCP.

SUMMARY OF THE INVENTION

The invention overcoming these and other problems in the art in one aspect provides an adaptive channel allocation system and method, capable of monitoring and allocating network resources in an efficient and equitable manner. The adaptive channel allocation system of the invention includes means provided in the network switch, to intelligently monitor and recalculate channel allocations for sources which are not utilizing their full bandwidth commitments.

In the case of a communication source which makes a VC request but does not consume the bandwidth it has negotiated (a "lazy source"), the adaptive channel allocation system of the invention provides a reduction function, at the switch rather than the source itself. The channel decrease achieved has the following broad characteristics. First, a "decay" function is applied to such lazy sources that is based on an exponentially smoothed function of the sources' actual transmission rate, smoothed over time. This drives allocation to an average transmission rate that the source is actually using, rather than keying on a single sample of time over which the source may perform the decrease.

Second, the "decay" function applied is non-linear, so that the slower the source is transmitting relative to the allocated (or stated) rate, the larger the decrease in resource (channel) allocation, in adaptive fashion.

For sources which have negotiated a connection bandwidth but have not initiated communication for a period of time that is substantial, the adaptive channel allocation system of the invention provides a timeout mechanism to require such idle sources to withdraw their allocated rate, so as to at least approximately match the behavior of the network which is withdrawing allocation to the source. Allowed cell rate (ACR), is the transmission rate that is stored at the source, which has been allowed by the network for that source, and is considered the rate at which the source will be transmitting. The ACR is also the rate which the source puts into the CCR field, of an RM cell. Since idle sources are not transmitting RM cells, at least some timeout rule to have such sources reduce their ACR in the absence of RM feedback is desirable, in the practice of the invention.

DETAILED DESCRIPTION OF THE DRAWINGS

Figure 1:
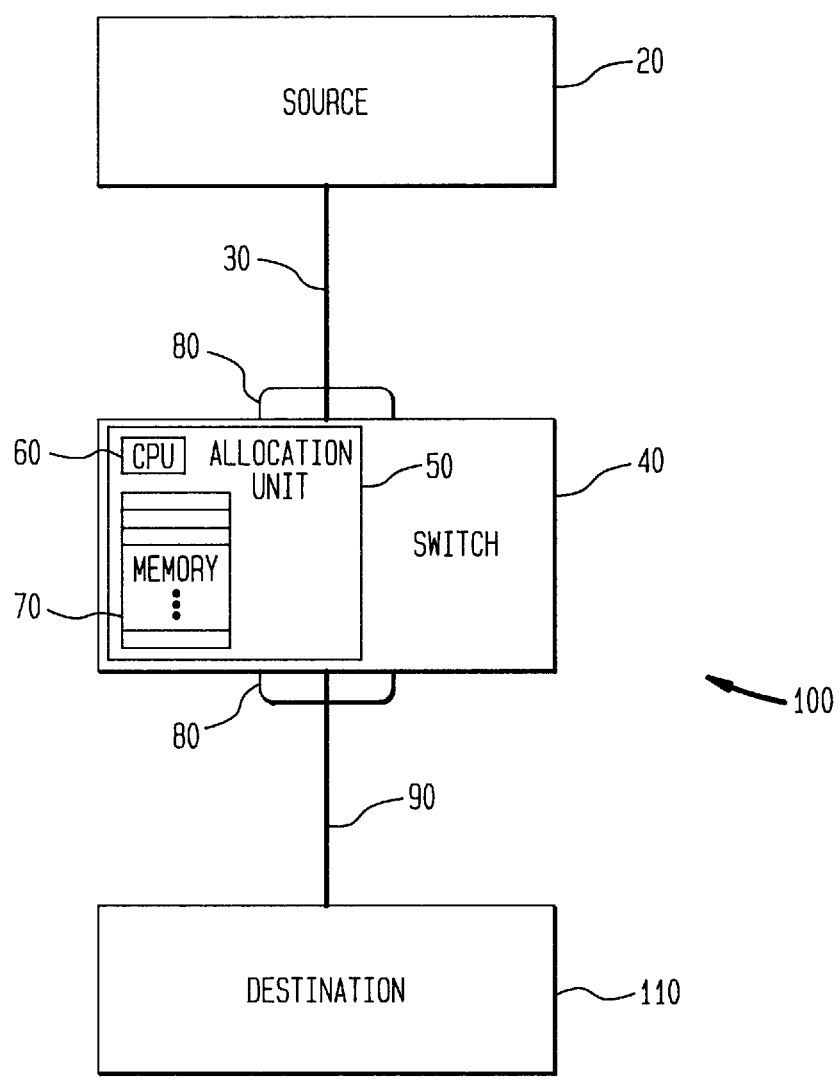
FIG. 1 illustrates a schematic diagram of an adaptive channel communication system according to the invention.

The adaptive channel allocation system 10 of the invention will be described with reference to FIGS. 1–6.

In the adaptive channel allocation system of the invention 10, a request for communication bandwidth (VC) is tendered by a communication source 20, in the form of an ER (explicit rate) value in an RM cell. An RM cell contains both the ER (request) field, and a CCR field. The CCR field is an indication of the current rate that source 20 is transmitting at. The ER value gets reduced or marked down, as the RM cell traverses network 100, to the smallest value of available bandwidth in connective links in network 100 (that is, to reflect the narrowest segment of the communication pipeline). Source 20 can be a source of voice, video, audio, computer, facsimile, or other data intended to traverse the network 100, and be delivered to destination station 110. The maximum rate possible for individual sources varies with network configuration and other factors, but can fall in the range of up to megabits per second, or higher. Phone line, optical cable, cellular, microwave and other types of communication connection technology can be used to form link 30 between source 20 and switch 40 (and link 90 between switch 40 and destination 110).

The requested rate of source 20 reaches and is registered by network switch 40, of which a plurality are located throughout the network 100. Network switch 40 contains a processor 60, memory 70, ports 80 and associated hardware, as will be appreciated by persons skilled in the art. In the adaptive channel allocation system 10 of the invention, the re-allocation (or "use-it-or-lose-it", UILI) mechanism applied by switch 40 is significant, whenever there is a commitment of resources for a particular communication flow.

This may be in the case of connection-oriented networks such as ATM or STM, where the network 100 allocates resources for each communication transaction that is negotiated. It is also relevant in connectionless networks, where there is a commitment of resources for the purpose of maintaining a given quality (bandwidth or otherwise) of service. In a connection oriented network, even for the best-effort class of service (Available Bit Rate, ABR), the network 100 makes an allocation of resources so that performance is assured in some manner: switches 40 commit some of the link bandwidth to each individual flow (VC) over a period of time. This period of time is typically until a new request is received from the source (or the VC) for new bandwidth. Allocations for all the flows therefore may converge to a known fair set of values. One notion of fairness for these values is that of max-min fairness.

A switch allocation mechanism that achieves max-min fairness using resource management (RM) cells, has been described in the inventors' patent application Ser. No. 08/460,965 filed Jun. 5, 1995 and fully incorporated here by reference. This mechanism calculates a rate to be provided to a flow, based on requested rate received by the switch 40 in the RM cell. This rate is retained, until another RM cell is received from a source.

In the case of connectionless networks, there is a notion of reservation using the RSVP protocol, wherein the resources are reserved by a destination 110 in a "reserve" message. In this environment, there is the notion of "soft" state, which is refreshed periodically by the receiver. However, in the interest of minimizing overhead, these "reserve" messages may be transmitted less frequently than desired for the purpose of maintaining high utilization. The adaptive channel allocation system of the invention may be utilized for managing the network resources in that environment, as well, where an individual flow's utilization is kept track of.

As noted, the retention of channel allocation for sources 20 that remain idle for a period of time ("idle sources") is undesirable because that bandwidth is wasted, and never recovered. Similarly, a source that is "lazy", or not sending at its allocated rate, also causes under-utilization of the network 100. Network-wide utilization could be increased, since wasted bandwidth may be reallocated to sources that may in fact use the unused bandwidth. Sources may be "lazy" or "idle" for a variety of reasons, including those related to RPCs, TCP flows on top of the ATM ABR service, and other application factors.

As also noted, another problem that exists in ensuring efficiency of network 100 is that source 20 may or may not be perfectly altruistic, and hold unused bandwidth: there is a natural need for the network to police the flow, so that the source does not violate the implied contract between source 20 and the network 100. In the invention this helps motivate the deployment of rate allocation responsibility to switches 40 that are able to perform the UILI function, so that independent and impartial policing is possible.

The reallocation function deployed at the switch 40 in the adaptive channel allocation system of the invention has the following characteristics. First, the switch 40 estimates the actual rate of a connection to a source 20, to derive a smoothed average rate. The method by which switch 40 computes the average is to use an exponentially smoothed average, to derive the rate. The justification for using such an average in the switch 40 of the invention is as follows.

In terms of rationale for the approach of using exponential, rather than for instance linear, averages to estimate rate, the average could be based on the simple time elapsed between receipt of 2 RM cells (in which 31 data cells are assumed to be sent by source 20). This averaging technique is, however, prone to considerable noise, and also leads to poor behavior for idle sources. This is because a long idle time before the sending of an RM cell, results in the average of the rate immediately decreasing to a very small value. If one were to withdraw the allocation based on this smaller average value, the allocation may be withdrawn at an inopportune time, when re-activation occurs. This is particularly true for TCP and RPC behavior.

An average could be based on a moving time window, tracking the number of cells that arrive over a given time period. One difficulty with this technique however is that it does not necessarily yield the proper average. A source that is sending bursty data, with relatively long idle periods in between, results in the average rate being driven down to the long-term average. Unfortunately, for such bursty sources it is undesirable to bring the allocation down to its long-term average rate, since it prevents flows from ramping up to their higher desired burst rate until a relatively long time after activity has resumed.

In the adaptive channel allocation system of the invention, therefore, the estimate of the average transmission rate is based on an exponentially smoothed average. This technique uses a weighted sum of the previous running average, and the current sample (S) value. "S" is the instantaneous estimated rate based on the time between 2 successive RM cells, taking the inverse to derive the rate, with $\beta$ as a weighting factor. The exponentially smoothed average rate ACR(t+1), at each successive time increment t+1, is estimated as $$ACR(t+1)=\beta ACR(t)+(1-\beta)^*S. \qquad \text{Equation 1}$$

This is used upon the arrival of an RM for this VC. The reduction factor is computed (in allocation unit 50 of switch 40) according to $$\text{Reduction Factor}=e^{\alpha\mu}-e^{\alpha\delta} \qquad \text{Equation 2}$$

The variable "u" is the ratio of (expected rate/actual rate). The sample value extracted (S) is based on the amount of time it has taken since the last RM cell was received at switch 40, which eliminates dependency on received data (as opposed to RM) cells, improving accuracy with low-usage sources which may not transmit data cells frequently. Thus, the exponential average provides a weight for the current sample: the higher the weight α, the larger the effect of the current sample, relative to the accumulated history. However, the effect of the current sample decays over time, more rapidly with larger values of α. This exponential smoothing is desirable, because transients are smoothed out relatively quickly. Outliers in the sampled points (e.g., when there is one long idle period) get smoothed out, promptly. The exponential smoothing achieves an event average, rather than a time average, which is the appropriate method to use in the adaptive channel allocation system 10 of the invention.

The switch 40 maintains a local allocation for the VC based on the max-min fair allocation computation, as described in L. Kalampoukas, A. Varma, and K. K. Ramakrishnan, "Examination of TM Source Behavior with an Efficient Switch Rate Allocation Algorithm", presented Jun. 6, 1995 at ATM Forum Meeting, Orlando, Fla. and the inventor's fore-mentioned patent application Ser. No. 08/460,965. The allocation provided to a VC is the rate the connection claims to transmit at, which is the CCR.

To help achieve the advantage of UILI monitoring, the invention applies the deallocation function at the switch 40. The goal of the deallocation function is to reallocate the bandwidth from idle or lazy sources to connections that are non-satisfied. The deallocation function computes a rate to take away from such an idle or lazy source, based on the ratio of the rate estimate maintained at the switch (based on the average computed) and the expected rate (which is the rate stated in the CCR field in the RM cell for the VC).

The reduction of the allocation (ACR) to a VC is based on a non-linear function, as described above. The further away the actual rate (denoted estimated rate, based on the exponentially smoothed average as the actual rate) from the expected rate (the rate stated in the CCR field of the VC), the larger the withdrawal of the ACR allocated rate to source 20. The rationale once again for this, is that in the invention it is desired to reallocate as much of the unused bandwidth to other VCs as possible. The larger the difference, the greater the amount of underutilization, a penalty to be avoided. Therefore, the reduction factor (the multiplier for the withdrawal of allocation) is used which is exponential in nature. The invention simplifies the reduction factor to be a linear function of the difference between exponential quantities, or even a constant amount. The actual newly allocated resource is computed as ACR=ACR*(1−Reduction Factor).

While all these allocative techniques will eventually drive convergence to a fair allocation using the actual rate of the VC, these generally converge slower. The shape of the reduction factor employed is shown below in FIG. 3. Again, "u" is the ratio {expected rate/actual rate}.

In the invention, an offset is used for the ratio, denoted δ. This is the "headroom" by which a VC may increase its actual rate. The headroom is proportional to the ratio of the expected and the actual rate. This headroom may be a constant amount, or may be a function of the source's actual rate or the expected rate. In the adaptive channel allocation system of the invention the headroom is preferably smaller when the difference between the actual and the expected rate is small, and larger when they differ by a significant amount. This allows for scaling to accommodate even a large number of VCs in network 100, unlike alternative approaches.

There is a need to choose values for α and δ, in the reduction factor expressed above. The choice for δ is driven by the need to provide headroom: the smaller the amount of headroom desired to be provided (so as to permit scaling up to a very large number of VCs), the smaller the value of δ should be. In an exemplary embodiment δ is chosen to be 1.2, to yield approximately a 20% headroom increase in the rate for the VC from its current actual rate.

Figure 4:
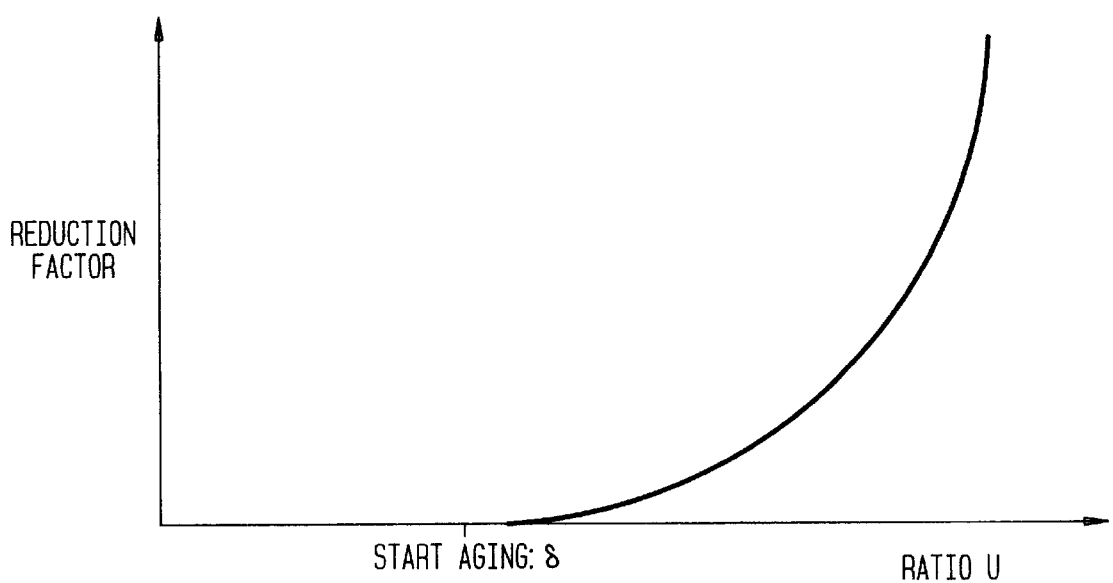
FIG. 4 illustrates the effect of the ratio used on the form of the reduction factor.
Figure 5:
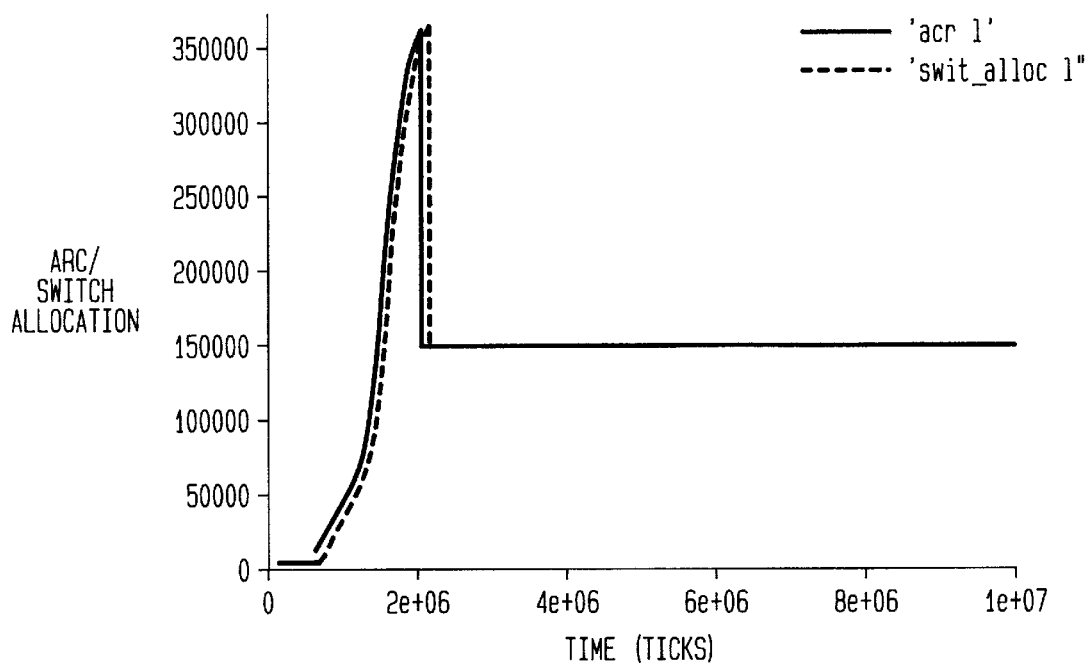
FIG. 5 illustrates data activity in an ATM system implementing according to the adaptive channel allocation system of the invention.

FIG. 4 shows the variation of the reduction factor with respect to the ratio u=(expected rate/actual rate). The larger the value of α, the larger the reduction factor. Also, the non-linearity in the reduction is more pronounced (the exponential nature of the decrease dominates) as the value of α increases. Different values of α may result in an appropriate amount of reduction, in different communication environments. This may in fact depend on configuration, workload and the number of VCs (ideally, at most only on the number of VCs).

The actual withdrawal of the allocation of network resources (bandwidth) by switch 40 is performed by a modification to the "max-min" fair allocation mechanism that the switch 40 is computing. In principle, the adaptive channel allocation system of the invention 10 conveys the reduction of the rate of transmission to the source 20 in one of 3 possible ways:

1) The reduced rate (by reducing the Explicit Rate, ER, field by the reduction factor) is now the one used in making the max-min fair allocation to source 20. Then the rate returned is on the basis of the result of the calculation.

2) The demand received in the ER field is used to compute the max-min fair allocation. Then the reduction factor is used to compute the actual allocation delivered to the source 20.

3) The demand received in the ER field is used to compute the max-min fair allocation (as in 2). However, instead of using a reduction factor, set the local allocation for the source equal to the estimated rate for the VC, plus headroom. In this policy the CCR field is not used at all.

Although each option may result in the same allocation for a lazy source, the network dynamics may be slightly different. The case with a single bottleneck in the network (e.g., a single switch) may be examined. When option (1) to reduce the rate before computing allocation is used, demand is reduced (as specified in the ER field) based on the reduction factor. Depending on the size of the reduction factor, the flow's demand may be reduced significantly, so as to enable other sources that would have been limited, to now no longer be limited. This allows the other flows to increase, as a result of the new calculation that reallocates bandwidth on this round trip. If the feedback delays are significant and the flow whose rate was reduced were to start up, then a period of infeasability would result. This is caused by the other flows having received a reallocation, allowing them to increase while the flow whose rate has been reallocated has not received an updated rate yet.

Another implementation problem is potential loss of the original demand of the flow, although in the case of the network of switches each option is similar. Therefore, to even allow headroom as a function of the source's demand is difficult.

The second approach is to perform the rate calculation based on the demand, perform a reduction, and use that as the basis for the rate allocation for the flow. While this has ostensibly the same effect as the previous option in a network of switches, the reallocation may be performed somewhat slower in this approach for the single bottleneck case. The rates for the sources 20 that receive unused bandwidth will be increased only after one more round-trip, thus reducing the degree of infeasibility. The difference between the options in a network of switches is likely to be minimal, however.

The technique consequently used to preferably perform the reallocation function in the invention is as follows.

During negotiation of the rate, the explicit rate returned to the source 20 is placed in the RM cell forwarded. One more piece of information is kept in the switch (resulting in an increase in the amount of states stored in switch 40), which is the old_ER for that flow, that was sent in the previous allocation process. The fair allocation for the flow is computed using the ER received in the RM cell.

Then, expressed in a general pseudocode format, the reduction process is:

if (old_ER<fair allocation)

if (reduction_factor>0) then

ER_new=ER_old * (1−reduction_factor)

ER_sent_in_RM_cell=max (ER_new, actual_rate*$\delta$, ICR)

ER_old=ER_sent_in_RM_cell

The sources 20 receive the ER_sent_in_RM_cell to then perform an increase or decrease of their ACR, and set their current transmission rate.

In another aspect, the steps of the allocative process in the practice of the invention can in another embodiment be expressed more fully as:

1) Compute the sample S (time between 2 RM cells for this flow).

2) Compute the exponentially smoothed average rate of the flow, maintained at switch 40, according to Equation 1 above.

3) Compute the reduction factor (RF), according to Equation 2 above, with u=(CCR/ACR(t+1)) and $\alpha$ and $\delta$ parameters.

4) If source 20 is transmitting at a rate less than a Switch_Timeout_Factor, i.e. time between RM cells of a source>Switch_Timeout_Factor *(1/Allocated Rate), then assume demand for source=ICR (idle source case, see below); otherwise, demand for source= ER.

5) Then, compute the max-min fair share for the source according to the inventor's fore-mentioned Ser. No. 08/460,965. This is the Fair_Rate.

6) If the RF>0, then set a Temp_Allocation=max {Fair_Rate(1−RF), ICR}.

7) Then, render ER_Sent_in_RM_cell=max{ACR(t+1)*$\gamma$, Temp_Allocation}, where the $\gamma$ value may be the same or different from the $\delta$ value of Equation 2 .

8) Designate ER_New=ER_Sent_in_RM_Cell (to be placed in the RM cell when the RM cell is forwarded downstream).

9) The switch 40 then maintains a local allocation for the source, Local_Allocation=min{CCR,Fair_Rate,ER_New}.

In another embodiment, the adaptive channel allocation system of the invention 10 performs the following additional processing, for sources 20 who have had their allocation reduced. When a switch 40 has reduced allocation to a given source 20 (i.e. VC), the switch 40 generates an additional piece of state information, Aging_Flag, kept for that VC. In this embodiment, whenever the reduction factor RF is applied, the variable Aging_Flag is marked true. Subsequently, when the system of the invention 10 gives an allocation to that source, and it is greater than before, that is (ER_New>old ER sent in RM cell, previously), and Aging_Flag=true, then the allocation is performed as ER_Sent_In_RM_Cell=Rampup_Factor*(ER_New− old ER_sent_in_RM_cell)+old ER_sent_in_RM_cell.

In other words, the source which is becoming more active, is permitted to have its allocation increased at a graduated rate, to safeguard against impulse load. The allocation that the source is permitted, is increased in graduated fashion until present needs are satisfied. When this point is reached, and ER_Sent_In_RM_cell= or >(Fair_Rate), then Aging_Flag=False and old ER_Sent_in_RM_cell=ER_Sent_in_RM_cell, and the source is no longer considered lazy.

In addition to treating lazy sources as described above, the adaptive channel allocation system 10 of the invention accounts for truly idle sources to safeguard efficiency. Since idle sources do not send probes (or RM cells), switch 40 needs to independently withdraw allocations to these sources, so that reallocations are performed and other sources can use it. To address this contingency, the invention makes use of the notion of an timeout (or aging) function, Switch_Timeout_Factor.

When the time between reception of RM cells from a VC is greater than the Switch_Timeout_Factor as registered in allocation unit 50, then switch 40 spontaneously decides to withdraw the allocation. The demand and the current rate for the VC are set to the initial cell rate, ICR. The Switch_Timeout_Factor may be made conservative. The prior art (ATM Forum contributions) suggests a fixed default value of 500 milliseconds. The inventors have successfully experimented with adaptive values, on the order of 128 * (the expected RM cell interval) which permits more flexibility to changing network needs. The expected RM cell interval was based on a switch's 20 local allocation.

In addition to having a policy at the switch 40 to treat idle sources, the adaptive channel allocation system of the invention alternatively ensures that there is a policy at the source 20 itself, for dealing with idle periods. This is useful because switches may have reallocated the source's bandwidth to other VCs. Since the switch 40 has no means to communicate the new rate to the source 20 (idle sources are not required to transmit RM cells), the source 20 does not have up-to-date information. The resulting impulse load from the network 100 when the source awakens may result in undesirable overload. In the invention, a source timeout mechanism, similar to that suggested in the ATM Forum TM specification, may suitably be used. When a source starts up after a significant idle period (on the order of 500 milliseconds), the source rate is dropped to ICR (the initial rate).

Figure 2A:
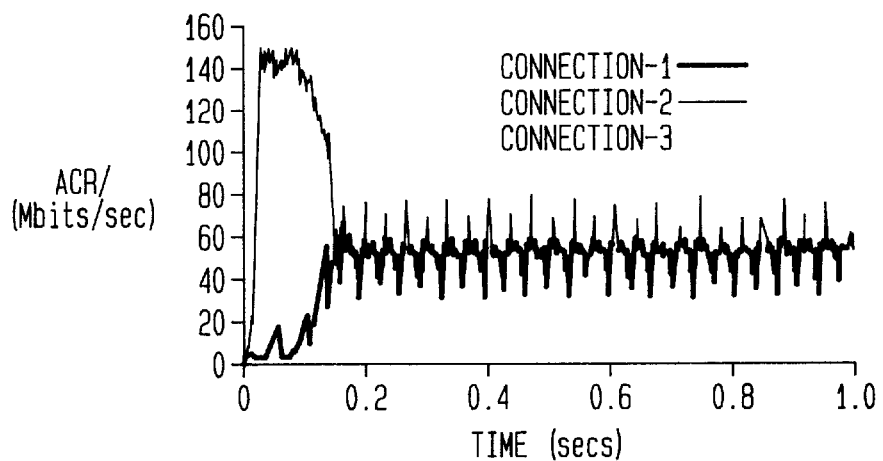
FIGS. 2A and 2B illustrate data activity in an ATM system implemented according to known source allocation systems.
Figure 2B:
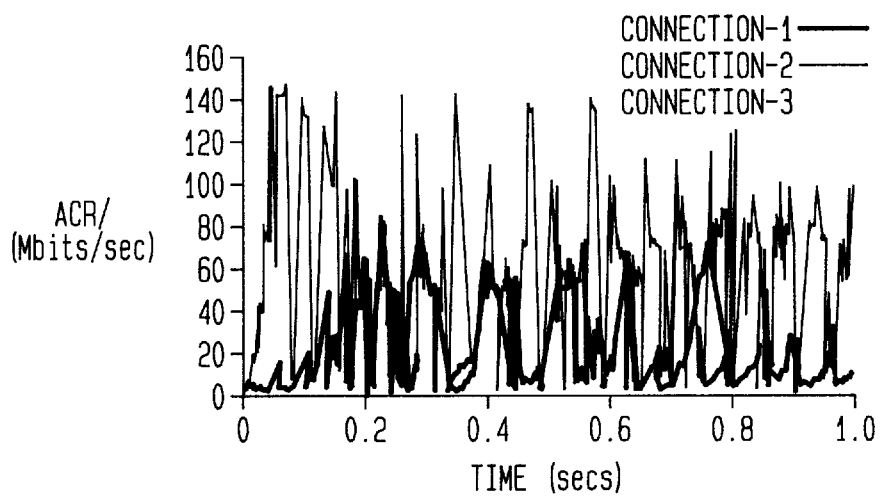
Figure 3:
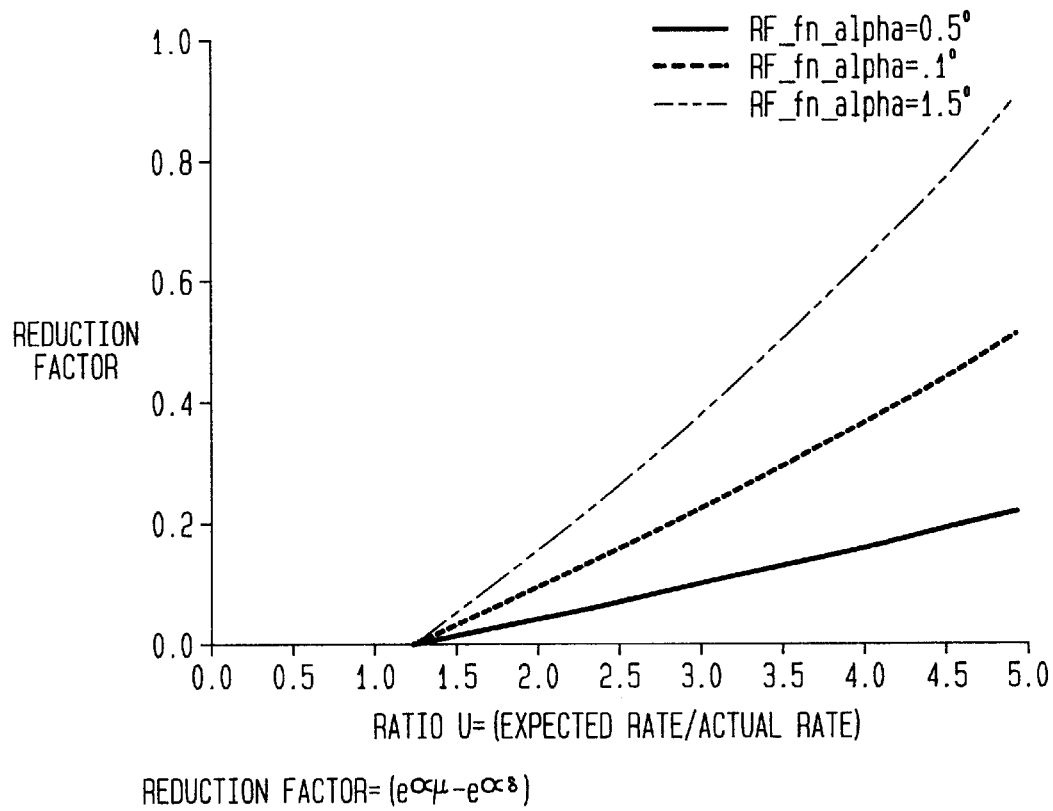
FIG. 3 illustrates the form of a reduction factor used to adjust resource allocation in the invention.
Figure 6:
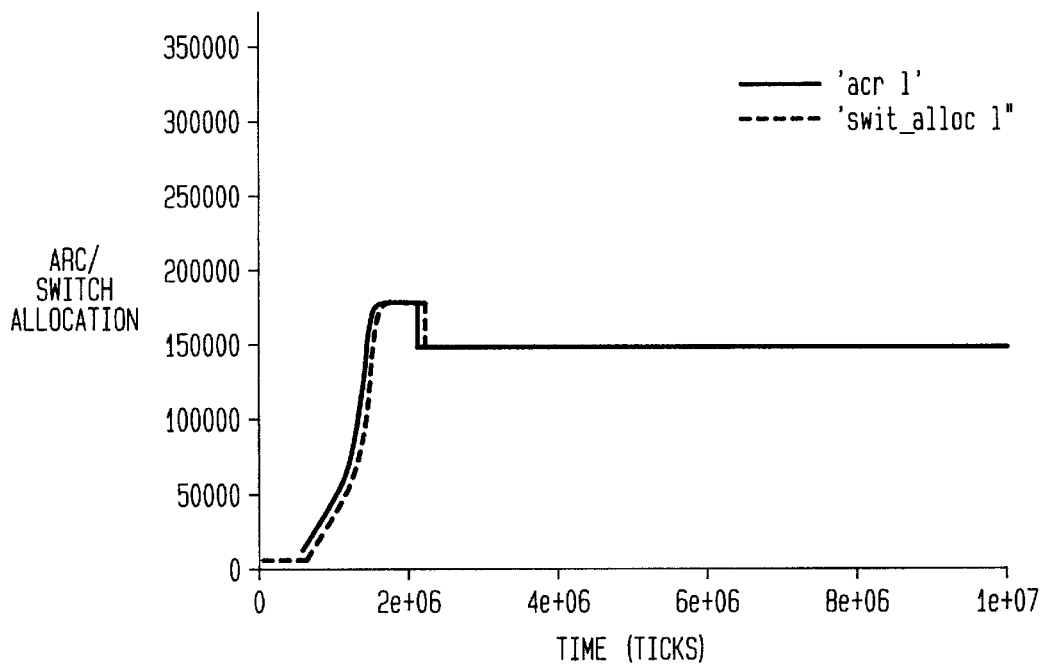
FIG. 6 illustrates data activity in an ATM system implemented according to an alternative embodiment of the adaptive channel allocation system of the invention, in which the source also applies a UILI policy.

Another alternative mechanism that may be employed in the policy applied at the source 20 in the invention is to implement a UILI function similar to that of switch 40, at source 20 also. Many commercially available sources contain CPU and other hardwire necessary to perform this local monitoring, as will be appreciated by persons skilled in the art. For example, a source 20 can monitor its own transmission rate and adjust the CCR down to the monitored rate, if this is less than the ACR. This has the advantage that a source 20 is able to detect underutilization more quickly than attendant switches 40. The effect of a combined source/switch implementation of the present invention is shown in FIG. 6, in which it may be noted that the transient overshoot of ACR is reduced, compared to the switch-only version. This might be compared to the more pronounced transients produced in prior art (source-based) allocation systems, as illustrated in FIGS. 2(A) and 2(B) (parameter-adjusted, and nonoptimized outputs respectively).

The adaptive channel allocation system of the invention achieves efficient distribution of scarce resources of the network 100, reducing the allocations to sources which are not fully using their negotiated bandwidth, while not simply extinguishing their flows. This allows such sources to re-enter the network with reduced impulse disruption, while still apportioning bandwidth that such sources have not used, to the rest of the network 100.

All the disclosures cited above are incorporated in this application by reference, as fully as if reproduced herein. The foregoing description of the adaptive channel allocation system of the invention is illustrative, and additions and variations in construction and implementation will occur to persons selected in the art. The scope of the invention is intended to be limited only by the following claims.

What is claimed is:

1. A channel allocation system for allocating communication resources to a source making a resource request, comprising:

a switch, operatively connected to the source through a communication link;

a channel allocation unit provided in the switch, the channel allocation unit monitoring the resource request transmitted by the source to the switch, the channel allocation unit replacing the resource allocation contained in the resource request with a revised resource allocation, the revised resource allocation being a function of a reduction factor computed by the channel allocation unit according to an exponential function of the resource allocation, and a current sample of resource usage by the source.

2. A channel allocation system according to claim 1, wherein the channel allocation unit computes the reduction factor as $e^{\alpha u} - e^{\alpha \delta}$, where $\alpha$ is a weight factor, $\delta$ is a headroom factor, and u is the ratio of the resource request divided by the current sample of resource usage.

3. A channel allocation system according to claim 1, wherein the channel allocation unit further calculates an aging function of the time separation between Resource Management(RM) cells of the source, multiplied by an aging constant, and deallocating the resource allocation when the aging function exceeds a predetermined threshold.

4. A channel allocation system according to claim 1, further comprising an aging timing unit provided in the source, and the resource allocation is deallocated according to the aging function of the source, or of the switch.

5. A channel allocation system according to claim 1, wherein the communication resource is network bandwidth in an ATM network.

6. A channel allocation system according to claim 1, wherein the source also computes the reduction factor and applies that factor replace its resource request with a source-revised resource allocation.

7. A method of allocating communications resources in a network, comprising the steps of:

a) receiving a resource request containing a resource allocation from a source;

b) monitoring the amount of network resources used by the source;

c) sampling current resource usage by the source; and d) replacing the resource allocation contained in the resource request with a revised resource allocation, the revised resource allocation being a function of a reduction factor computed according to an exponential function of the resource allocation, and a current sample of resource usage.

8. The method according to claim 7, wherein replacing step computes the reduction factor as $e^{\alpha u} - e^{\alpha \delta}$, where $\alpha$ is a weight factor, $\delta$ is a headroom factor, and u is the ratio of the resource request divided by the current sample of resource usage.

9. The method according to claim 7, further comprising the step of:

e) calculating an aging function of the time separation between Resource Management(RM) cells of the source, multiplied by an aging constant, and deallocating the resource allocation when the aging function exceeds a predetermined threshold.

10. The method according to claim 9, wherein the calculating is performed at the switch.

11. The method according to claim 9, wherein the calculating is also performed at the source.

12. The method according to claim 7, further comprising the steps of:

f) computing the reduction factor at the source; and g) replacing the resource request with a source-revised resource allocation according to the reduction factor, at the source.

* * * * *